UNITED STATES PATENT OFFICE.

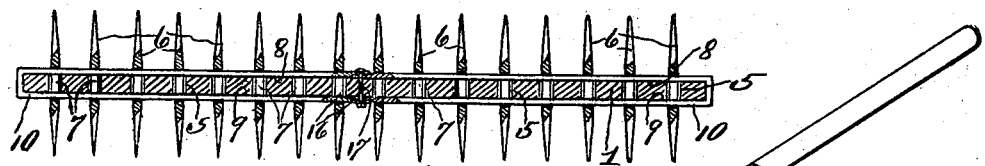
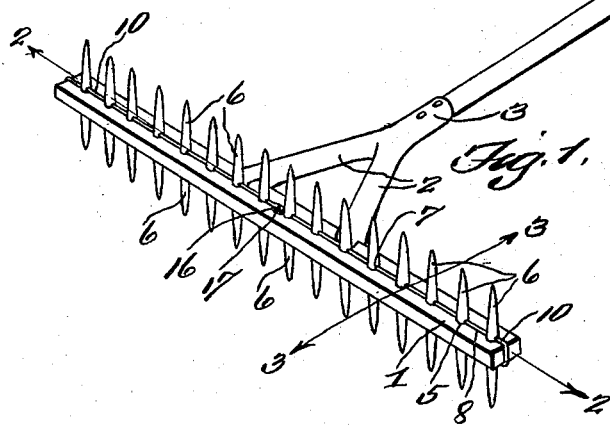
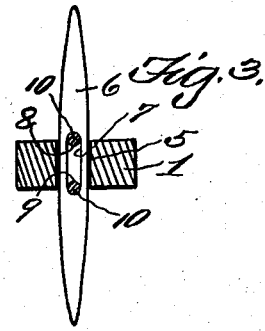
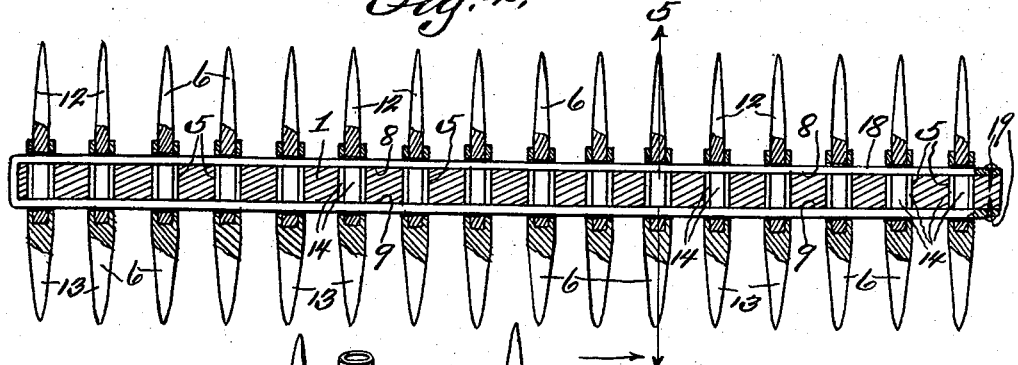
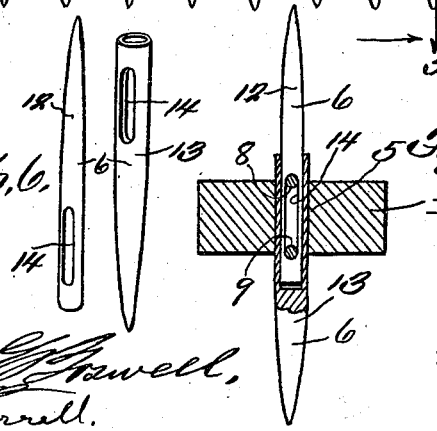

JOHN E. JOHNSON, OF RONCEVERTE, WEST VIRGINIA.

RAKE.

1,187,327. Specification of Letters Patent. Patented June 13, 1916.

Application filed March 1, 1916. Serial No. 81,434.

*To all whom it may concern:*

Be it known that I, JOHN E. JOHNSON, a citizen of the United States, residing at Ronceverte, in the county of Greenbrier, State of West Virginia, have invented a new and useful Rake; and I do hereby declare the following to be a full, clear, and exact description of the invention, such as will enable others skilled in the art to which it appertains to make and use the same.

This invention relates to the art of hand farming and gardening tools, and more especially to an improved rake, of the reversible or invertible kind, whereby the teeth of either the upper or lower set may be utilized.

One of the objects of the invention is the provision of a rake bar having rake teeth extending upwardly and downwardly, and being removably fixed in the bar, so that any one or several of the teeth may be removed and new ones inserted.

Another object of the invention is the provision of a tooth for a rake consisting of two sections, so that either one of the sections, may be replaced by a new section, when repairs are needed.

Another object of the invention is the provision of an elongated U-shaped member for securing all the teeth in the rake bar.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of the improved rake constructed in accordance with the invention. Fig. 2 is a sectional view on line 2—2 of Fig. 1, illustrating two U-shaped members or holders fitted to the rake bar from both ends thereof, to hold all the teeth of the rake in place. Fig. 3 is a cross sectional view on line 3—3 of Fig. 1. Fig. 4 is a sectional view showing a single U-shaped member for holding all the teeth on the rake bar, each tooth being constructed in two sections, so that either section may be repaired. Fig. 5 is a cross sectional view on line 5—5 of Fig. 4. Fig. 6 discloses detail views of the two sections 12 and 13 of the teeth in Figs. 4 and 5.

Referring more especially to the drawings, 1 designates a rake bar, formed integral with which are the forks 2 of the handle socket 3, which receives the handle 4. The bar 1 is provided with a series of apertures 5, through which the rake teeth 6 extend. The teeth where they extend through the bar 1 are provided with elongated slots 7. The teeth extend upwardly and downwardly, so that the rake may be inverted so that either side may be used. The upper and lower faces of the bar 1 are provided with grooves 8 and 9, which adjoin the openings 5. U-shaped members 10 arch the opposite ends of the rake bar, and their upper and lower parts engage said groove, and pass through the openings 7 of the teeth, as shown clearly in Fig. 2, thereby holding all the teeth securely in the bar. In Figs. 4 and 5 each tooth is constructed in two sections 12 and 13, and the section 13 where it passes through the bar is hollow, for the reception of the section 12. The telescoping parts of both sections are provided with registering slots 14, for the reception of the upper and lower portions of the single U-shaped securing member, so that both sections may be removably secured to the rake bar. The free end of the upper and lower arms or portions of the single U-shaped member overlie one end of the rake bar, thereby preventing the removal of the U-shaped member. Should any one or several of the teeth in Figs. 1, 2 and 3 become broken, or otherwise incapable as a rake tooth, the broken tooth or teeth may be easily removed, by removing either one or both of said U-shaped members. The adjacent end of the U-shaped members in Figs. 1, 2 and 3 are overlapped as shown at 16, and these overlapping parts are secured together and to the bar 1 by the pin 17 to prevent disconnection. Any one or several of the teeth in Figs. 4 and 5, or sections thereof may be removed, in case they become broken or otherwise impaired. The single U-shaped member 18 has its ends secured by pins 19 to the rake bar 1.

The invention having been set forth, what is claimed as new and useful is:

1. In combination, a rake bar having a handle and provided with a plurality of openings, the upper and lower faces of said bar having longitudinal grooves passing through and adjoining said openings, a plurality of teeth mounted in the openings and extending upwardly and downwardly, each tooth having an elongated slot adjacent where the tooth passes through the bar, and a U-shaped member arching the end of the bar and engaging said groove and passing through the elongated slot of the teeth, thereby detachably securing the teeth in the bar.

2. In combination, a rake bar having a handle and provided with a plurality of openings, a plurality of teeth engaging said openings and extending upwardly and below the bar, each of said teeth consisting of two sections telescopically united, the telescoping portions having registering elongated slots, and means passing through the elongated slot adjacent the upper and lower faces of the bar for securing the teeth detachably therein.

3. In combination, a rake bar having a handle and provided with a plurality of openings, a plurality of teeth engaging said openings and extending upwardly and below the bar, each of said teeth consisting of two sections telescopically united, the telescoping portions having registering elongated slots, the upper and lower faces of the bar having grooves, and a U-shaped member arching the end portion of the bar and engaging the groove and passing through the elongated slots of the telescoping parts of the sections of the teeth for holding the sections in place, and means for securing the ends of the U-shaped member to prevent its displacement.

In testimony whereof I have signed my name to this specification in the presence of two subscribing witnesses.

JOHN E. JOHNSON.

Witnesses:
JNO. S. CRAWFORD,
P. C. HOGSETT.

Copies of this patent may be obtained for five cents each, by addressing the "Commissioner of Patents, Washington, D. C."